(12) United States Patent
Nakamura et al.

(10) Patent No.: US 9,022,424 B2
(45) Date of Patent: May 5, 2015

(54) AIRBAG DEVICE

(75) Inventors: Atsushi Nakamura, Tokyo (JP); Atsushi Noguchi, Tokyo (JP); Yasuhito Miyata, Tokyo (JP); Kazuhiro Shingu, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/240,857

(22) PCT Filed: Jul. 27, 2012

(86) PCT No.: PCT/JP2012/069178
§ 371 (c)(1),
(2), (4) Date: Feb. 25, 2014

(87) PCT Pub. No.: WO2013/031452
PCT Pub. Date: Mar. 7, 2013

(65) Prior Publication Data
US 2014/0217712 A1    Aug. 7, 2014

(30) Foreign Application Priority Data

Aug. 30, 2011    (JP) .................................. 2011-188008

(51) Int. Cl.
*B60R 21/2338*    (2011.01)
*B60R 21/239*    (2006.01)

(52) U.S. Cl.
CPC ........... *B60R 21/239* (2013.01); *B60R 21/2338* (2013.01); *B60R 2021/2395* (2013.01); *B60R 2021/23384* (2013.01)

(58) Field of Classification Search
CPC .............. B60R 21/2338; B60R 21/239; B60R 21/23382; B60R 21/23386; B60R 21/231; B60R 21/23384; B60R 21/23388
USPC .................................. 280/739, 743.2, 740
See application file for complete search history.

(56) References Cited

U.S. PATENT DOCUMENTS 6,454,300 B1 *  9/2002  Dunkle et al. ................ 280/742
6,502,858 B2 *  1/2003  Amamori ................... 280/743.2

(Continued)

FOREIGN PATENT DOCUMENTS

JP    H06-127330 A    5/1994
JP    2001-301556 A   10/2001

(Continued)

OTHER PUBLICATIONS

International Search Report dated Sep. 11, 2012 in connection with International Application No. PCT/JP2012/069178.

*Primary Examiner* — Ruth Ilan
*Assistant Examiner* — Darlene P Condra
(74) *Attorney, Agent, or Firm* — Foley & Lardner LLP (57) ABSTRACT

An airbag device that can limit the movement of a strap outside an airbag even when the other end of the strap is released is provided. An airbag device includes an airbag 2 that is folded in a normal state and deployed in case of emergency, an inflator 3 that supplies gas to the airbag 2, a retainer 4 that secures the airbag 2 and the inflator, and a strap-retaining device 6 that retains a strap 5, which is connected to a portion of the airbag 2 at one end 51 thereof, at the other end 52 of the strap 5 in a releasable manner. The airbag device further includes a strap-restraining tether 7, which is connected to the strap 5 at one end 71 thereof and to the airbag 2 at the other end 72 thereof. The strap-restraining tether 7 limits the movement of the free end of the strap 5 that has been released.

8 Claims, 5 Drawing Sheets

(56) References Cited

U.S. PATENT DOCUMENTS

| | | |
|---|---|---|
| 6,773,030 B2 * | 8/2004 | Fischer .................. 280/739 |
| 7,552,942 B2 * | 6/2009 | Fischer et al. ............. 280/743.2 |
| 7,690,683 B2 * | 4/2010 | Parks et al. ............... 280/743.2 |
| 2001/0035639 A1 | 11/2001 | Amamori |
| 2003/0020266 A1 | 1/2003 | Vendely et al. |
| 2009/0020991 A1 * | 1/2009 | Abe et al. ................ 280/739 |
| 2009/0121460 A1 * | 5/2009 | Abe et al. ................ 280/728.3 |
| 2010/0201107 A1 * | 8/2010 | Abe et al. ................ 280/730.1 |
| 2011/0101652 A1 * | 5/2011 | Abe ........................ 280/728.3 |
| 2011/0309605 A1 * | 12/2011 | Kumagai .................. 280/741 |

FOREIGN PATENT DOCUMENTS

| | | |
|---|---|---|
| JP | 2008-308139 A | 12/2008 |
| JP | 2009-001064 A | 1/2009 |
| JP | 2009-001259 A | 1/2009 |
| JP | 2010-083175 A | 4/2010 |
| JP | 2010-173620 A | 8/2010 |
| JP | 2011-051499 A | 3/2011 |
| JP | 2012-171408 A | 9/2012 |

* cited by examiner

AIRBAG DEVICE

FIELD OF THE INVENTION

The present invention relates to airbag devices, and more particularly, to an airbag device including a strap that controls an open/closed state of a vent hole, the shape of an airbag, etc., with a tension thereof.

BACKGROUND OF THE INVENTION

A vehicle, such as an automobile, is generally equipped with an airbag device for absorbing impact applied to an occupant in case of emergency, such as a collision or an abrupt deceleration, by deploying an airbag in a vehicle. Various types of airbag devices have been developed and used. Examples of such an airbag device include a driver airbag device disposed in a steering wheel, a passenger airbag device disposed behind an instrument panel, a side airbag device disposed in a vehicle side portion or a seat, a curtain airbag device disposed in an upper portion of a door, a knee airbag device for the knees of an occupant, and a pedestrian airbag device disposed below the hood.

Such an airbag device generally includes an airbag that is folded in a normal state and deployed in case of emergency, an inflator that supplies gas to the airbag, and a retainer that secures the airbag and the inflator. The airbag may be provided with, for example, a strap which regulates the shape into which the airbag is deployed or controls an open/closed state of a vent hole (see, for example, PTL 1 to PTL 4).

An airbag device described in PTL 1 includes a strap-retaining device, which includes a pin element and a squib, and a patch element (strap) that is connected to the outer surface of an airbag at one end thereof and engageable with the pin element at the other end thereof. An open/closed state of a vent hole is controlled by controlling a retained/released state of the patch element (see, for example, FIGS. 4 to 7 of PTL 1). When the patch element is released from the pin element, the patch element is ejected to the outside of the airbag through the vent hole by a tension applied thereto, so that the vent hole is opened (see, for example, FIG. 7 of PTL 1).

An airbag device described in PTL 2 includes a connection selection mechanism (strap-retaining device), which includes an actuator, and a connecting element (strap) that is connected to the outer surface of an airbag at one end thereof and engaged with a retaining portion, which is disposed adjacent to the connection selection mechanism, at the other end thereof. An open/closed state of a vent hole is controlled by controlling a retained/released state of the connecting element (see, for example, FIGS. 1 to 13 of PTL 2). When the connecting element is released from the retaining portion by an operation of the connection selection mechanism, the connecting element is pulled out of the airbag by a tension applied thereto, so that the vent hole is opened (see, for example, FIG. 13 of PTL 2).

An airbag device described in PTL 3 includes an actuator (strap-retaining device), which includes a cutter and a gas generating device, and a tether (strap) that is connected to a duct portion that projects out of an airbag at one end thereof and engageable with the actuator at the other end thereof. An open/closed state of a vent hole, which is formed in the duct portion, is controlled by controlling a retained/released state of the tether (see, for example, FIG. 4 of PTL 3). When the tether is cut off and released by an operation of the actuator, the tether is pulled out of the airbag by a tension applied thereto, and the duct portion is reversed so that the vent hole is opened.

An airbag device described in PTL 4 includes a strap-retaining device, which includes a cap and a releasing device, and a strap that is connected to a projecting portion, which is formed so as to project out of an airbag, at one end thereof and capable of being engaged with the strap-retaining device by the cap at the other end thereof. An open/closed state of a vent hole, which is formed in the projecting portion, is controlled by controlling a retained/released state of the strap (see, for example, FIG. 5 of PTL 4). When the cap is blown away by an operation of the releasing device, the tether is pulled out of the airbag by a tension applied thereto, and the projecting portion stands on the airbag so that the vent hole is opened. Furthermore, FIG. 19 of PTL 4 illustrates that the volume of the airbag (shape thereof in a deployed state) can also be controlled by a similar operation.

CITATION LIST

Patent Literature

PTL 1: U.S. Pat. No. 6,648,371
PTL 2: Japanese Unexamined Patent Application Publication No. 2009-1259
PTL 3: Japanese Unexamined Patent Application Publication No. 2010-83175
PTL 4: Japanese Unexamined Patent Application Publication No. 2008-308139

SUMMARY OF INVENTION

Technical Problem

In each of the airbag devices described in PTL 1 to PTL 4, when the other end of the strap (referred to also as a tether, a connecting element, a patch, a belt, a fastening cord, etc.) connected to the strap-retaining device (referred to also as a connection selection mechanism, an actuator, a strap-releasing device, etc.) is released, the other end of the strap serves as a free end. Therefore, the other end of the strap is eventually ejected to the outside of the airbag due to the tension applied to the strap or gas pressure in the airbag. When the other end of the strap is ejected to the outside of the airbag, there is a possibility that the ejected strap will deform an object connected thereto (the outer surface of the airbag, the duct portion, the projecting portion, etc.) or become entangled with a part of the vehicle.

The present invention has been made in light of the above-described problem, and an object of the present invention is to provide an airbag device that can limit the movement of a strap outside an airbag even when the other end of the strap is released.

Solution to Problem

The present invention provides an airbag device including an airbag that is folded in a normal state and deployed in case of emergency, an inflator that supplies gas to the airbag, a retainer that secures the airbag and the inflator, and a strap-retaining device that retains a strap, which is connected to a portion of the airbag at one end thereof, at the other end of the strap in a releasable manner. The airbag device further includes a strap-restraining tether, which is connected to the strap at one end thereof and to the airbag or the retainer at the other end thereof.

The one end of the strap may be connected to an outer shell of the airbag, a valve element that opens and closes a vent hole formed in the airbag, a cylindrical member that defines the vent hole of the airbag, or a projecting portion having the vent hole of the airbag. The other end of the strap may extend into the airbag through a slit formed in the airbag. A connecting portion between the strap-restraining tether and the strap may be formed of a seam that extends in a longitudinal direction of the strap.

The strap-restraining tether may be connected to the strap in a region near a distal end portion at the other end of the strap. The strap-restraining tether may be capable of being cut at an intermediate portion or a connecting portion when a predetermined tension is applied thereto. The strap-restraining tether may be formed of a portion of a member that forms the strap. The strap and the strap-restraining tether may be formed of a base cloth used to form the airbag or a webbing material used to form a seatbelt.

Advantageous Effects of Invention

According to the above-described airbag device of the present invention, the strap-restraining tether is connected to the strap configured such that the other end thereof is releasable. Therefore, even when the other end of the strap is released, the state in which the strap is connected to the airbag device by the strap-restraining tether can be maintained, and the movement of the strap outside the airbag can be limited.

When the one end of the strap is connected to the outer shell of the airbag, the valve element, the cylindrical member, or the projecting portion, the other end of the strap is easily ejected to the outside of the airbag when the other end of the strap is released. Even in such a case, according to the present invention, the movement of the strap outside the airbag can be limited by the strap-restraining tether.

When the other end of the strap extends into the airbag from the outside of the airbag, the other end of the strap is easily ejected to the outside of the airbag by the tension applied to the strap. Even in such a case, according to the present invention, the movement of the strap outside the airbag can be limited by the strap-restraining tether.

When the connecting portion between the strap-restraining tether and the strap is formed of the seam that extends in the longitudinal direction of the strap, the resistance generated when the connecting portion passes through a slit formed in the airbag can be reduced, so that operations (for example, operation of opening the vent hole) carried out in response to releasing of the strap are not impeded.

When the strap-restraining tether is connected to the strap in a region near the distal end portion at the other end of the strap, the length of the free end portion of the strap can be reduced and the movement of the strap outside the airbag can be effectively limited.

When the strap-restraining tether is capable of being cut at the intermediate portion or the connecting portion when a predetermined tension is applied thereto, even if the strap is caught by another object, such as a structural member of the vehicle, the strap can be easily released from the object.

When the strap-restraining tether is formed of a portion of the member that forms the strap, it is not necessary to take into account the positioning of the connecting position of the strap-restraining tether, and the manufacturing process can be simplified.

When the strap and the strap-restraining tether are formed of the base cloth or the webbing material, components that satisfy predetermined regulatory requirements regarding the strength, flame resistance, environmental resistance, etc., in the field of vehicle safety devices can be easily obtained. In addition, remnants of material or cloth used to form a vehicle safety device can be effectively utilized.

BRIEF DESCRIPTION OF DRAWINGS

FIG. 1 shows the overall structure of an airbag device according to a first embodiment of the present invention, wherein

FIG. 2 illustrates connecting positions of a strap-restraining tether, wherein

FIG. 3 illustrates a method for connecting the strap-restraining tether, wherein

FIG. 4 illustrates the state in which the strap-restraining tether is cut, wherein

FIG. 5 shows enlarged views of portions of airbag devices according to other embodiments of the present invention, wherein

DESCRIPTION OF EMBODIMENTS

Figure 1A:
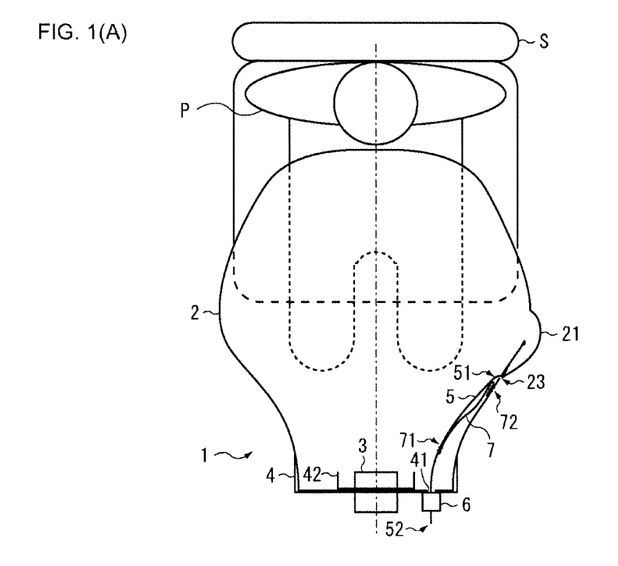
FIG. 1(A) shows the state in which a strap is retained.
Figure 1B:
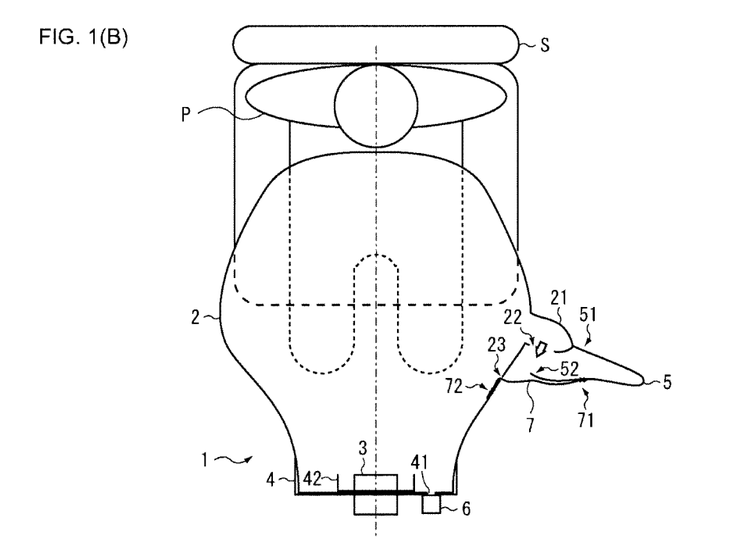
FIG. 1(B) shows the state in which the strap is released.
Figure 2A:
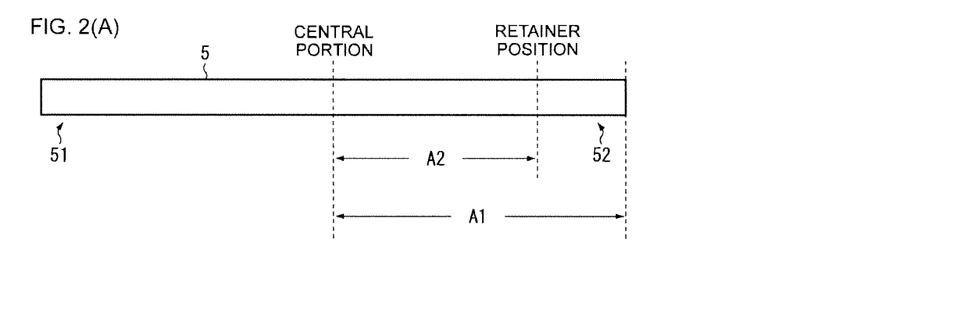
FIG. 2(A) shows a connecting portion between the strap and the strap-restraining tether.
Figure 2B:
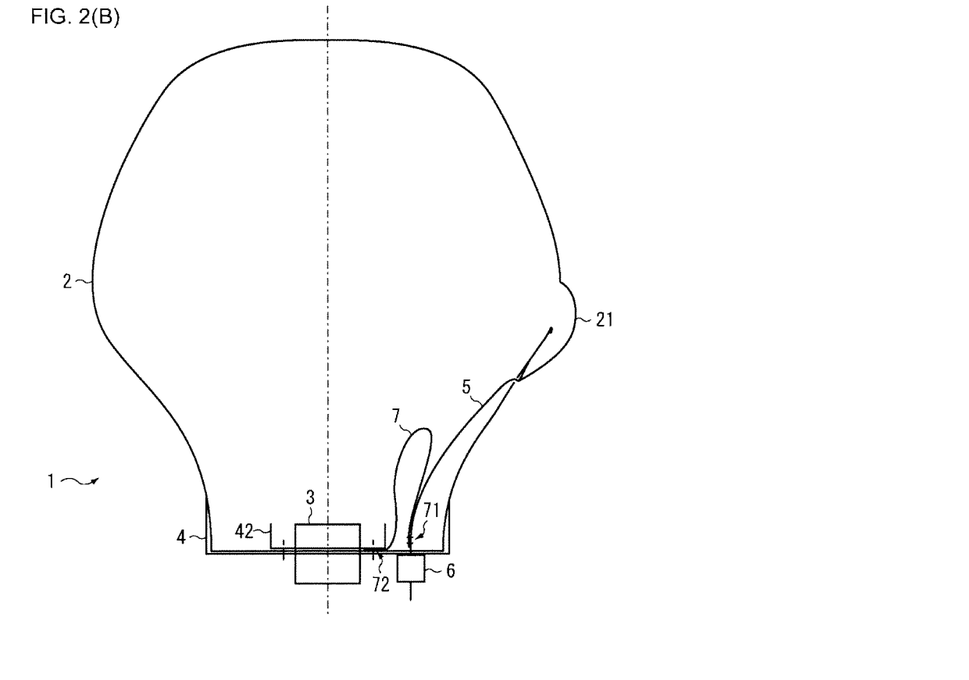
FIG. 2(B) shows a modification of a connecting portion between the strap-restraining tether and the airbag device.
Figure 3A:
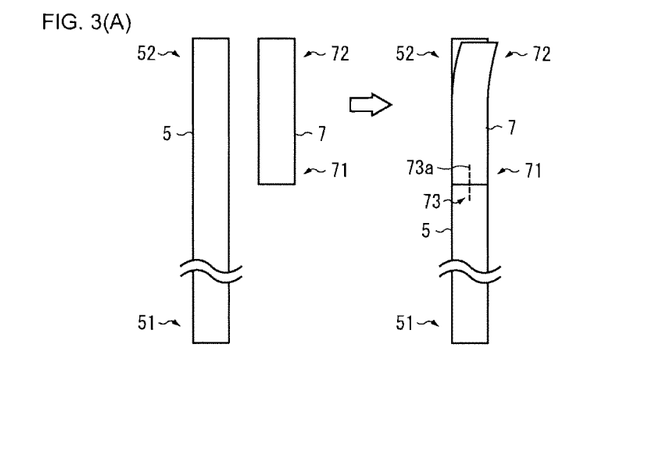
FIG. 3(A) shows the case in which the strap-restraining tether and the strap are separate components.
Figure 3B:
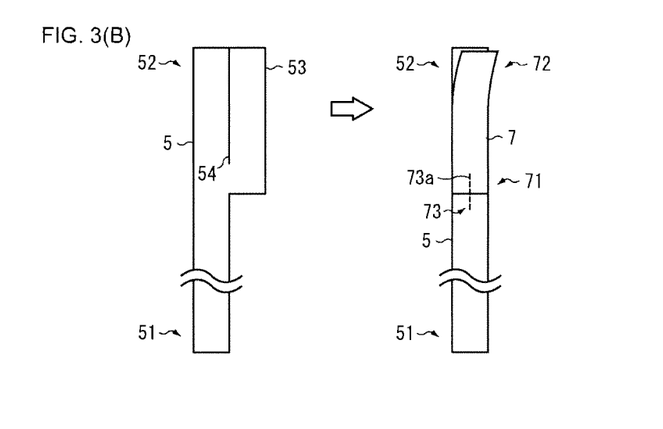
FIG. 3(B) shows the case in which the strap-restraining tether is integrated with the strap.

Embodiments of the present invention will now be described with reference to FIGS. 1 to 5. FIG. 1 shows the overall structure of an airbag device according to a first embodiment of the present invention, wherein FIG. 1(A) shows the state in which a strap is retained, and FIG. 1(B) shows the state in which the strap is released. FIG. 2 illustrates connecting positions of a strap-restraining tether, wherein FIG. 2(A) shows a connecting portion between the strap and the strap-restraining tether, and FIG. 2(B) shows a modification of a connecting portion between the strap-restraining tether and the airbag device. FIG. 3 illustrates a method for connecting the strap-restraining tether, wherein FIG. 3(A) shows the case in which the strap-restraining tether and the strap are separate components, and FIG. 3(B) shows the case in which the strap-restraining tether is integrated with the strap.

As illustrated in FIGS. 1 to 3, an airbag device 1 according to the first embodiment of the present invention includes an airbag 2 that is folded in a normal state and deployed in case of emergency; an inflator 3 that supplies gas to the airbag 2; a retainer 4 that secures the airbag 2 and the inflator 3; and a strap-retaining device 6 that retains a strap 5, which is connected to a portion (projecting portion 21) of the airbag 2 at one end 51 thereof, at the other end 52 of the strap 5 in a releasable manner. The airbag device 1 further includes a strap-restraining tether 7, which is connected to the strap 5 at one end 71 and to the airbag 2 at the other end 72.

The airbag device 1 illustrated in FIGS. 1(A) and 1(B) is, for example, a passenger airbag device, and is installed by being fixed to an instrument panel (not shown) arranged in front of a passenger seat. The airbag 2, which is installed in a folded state, starts to deploy when the inflator 3 is activated so that gas is supplied to the airbag 2. The airbag 2 enters the vehicle cabin by breaking through the instrument panel, and deploys in front of an occupant P who sits on a seat S.

The airbag 2 includes the projecting portion 21, which is connected to an opening formed in an outer shell of the airbag 2. A vent hole 22 is formed in a region inside the projecting portion 21, more specifically, in a region where the projecting portion 21 overlaps the airbag 2 when the projecting portion 21 is pulled by the strap 5. The one end 51 of the strap 5 is connected to a top portion of the projecting portion 21. The airbag 2 has a slit 23 in a region between the projecting portion 21 and the retainer 4, the slit 23 being shaped so that the strap 5 can be inserted therethrough. The other end 52 of the strap 5 extends into the airbag 2 through the slit 23 formed in the airbag 2. The slit 23 may either be a cut (cut portion) formed in the outer shell of the airbag 2, or an elongate opening. When the strap 5 is pulled toward the inflator 3, as illustrated in FIG. 1(A), the inner side of the projecting portion 21 is pressed against the surface of the airbag 2, so that the vent hole 22 is closed and the inner pressure of the airbag 2 is maintained.

The projecting portion 21 may be provided at one side (for example, at the side facing the center of the vehicle) of the airbag 2, as illustrated in the figures, or at either side of the airbag 2. In addition to the vent hole 22 formed in the projecting portion 21, the airbag 2 may also have a normally open vent hole (not shown) in the outer shell thereof. When the normally open vent hole is formed, even when the vent hole 22 formed in the projecting portion 21 is closed, the gas can be discharged to the outside of the airbag 2, so that the impact generated when the occupant P comes into contact with the airbag 2 can be reduced.

The inflator 3 is a gas generator that generates the gas to be supplied to the airbag 2, and is substantially disc-shaped. Although the disc-shaped inflator 3 is illustrated in FIG. 1, a cylinder-shaped inflator 3 having a substantially columnar shape may instead be used. The inflator 3 is connected to an electronic control unit (ECU) (not shown), and is controlled on the basis of a measurement value obtained by, for example, an acceleration sensor. When the ECU detects or predicts a collision or an abrupt deceleration of the vehicle, the inflator 3 is ignited by an ignition current supplied from the ECU. Accordingly, a chemical agent contained in the inflator 3 is burned so that gas is generated, and the gas is supplied to the airbag 2.

The retainer 4 is supported by being engaged with leg portions provided on a back surface of an instrument panel or an airbag cover fitted to the instrument panel. In general, the retainer 4 is fixed to a vehicle structure provided behind the instrument panel by a bracket. As illustrated, when the strap-retaining device 6 is disposed outside the retainer 4, an opening 41 that allows the other end 52 of the strap 5 to extend to the outside is formed in the retainer 4. The opening 41 is slightly larger than the cross section of the strap 5, and has the shape of, for example, an elongate slit or slot. The retainer 4 is not limited to that having the illustrated structure, and may be replaced by various types of retainers that have been commonly used.

The strap 5 is provided to adjust the tension applied to the projecting portion 21 to cause the projecting portion 21 to be in close contact with the surface of the airbag 2 or stand on the surface of the airbag 2. The strap 5 may be made of various types of woven or nonwoven fabric, and may be made of base cloth used to form the airbag 2 or a webbing material used to form a seat belt. In the case where the strap 5 is made of the base cloth, the strap 5 is formed in the shape of a substantially flat rope by folding a single piece of base cloth a plurality of times, or stacking a plurality of pieces of base cloth together, and then sewing the base cloth. In the case where the strap 5 is made of the webbing material, the strap 5 is formed in the shape of a substantially flat rope by cutting a single piece of webbing to such a width that sufficient strength can be ensured or by manufacturing a strap having a small width by a method similar to the method for forming the webbing. Here, the term "strap" includes all elements capable of generating a tension T, such as, such as a tether, a connecting element, a patch, a belt, a fastening cord, a fastening rope, a cord-shaped member, a belt-shaped member, and a wire.

The strap-retaining device 6 retains the other end 52 of the strap 5 in a releasable manner, and is also called a releasing mechanism or a strap-releasing device. Specifically, the strap-retaining device 6 includes a retaining portion that retains the other end 52 of the strap 5 and a releasing device that releases the strap 5 from the retaining portion. The releasing device includes, for example, a squib, which is a micro gas generator (MGG). The squib is ignited by an ignition current (ignition signal) supplied from the electronic control unit (ECU), so that the chemical agent contained therein is burned and gas is generated. When the squib is activated in this way, a cap or a pin that retains the strap 5 is extracted, or the retained strap 5 is cut with a cutter, so that the strap 5 is released from the retained state.

Although the illustrated strap-retaining device 6 is disposed outside the retainer 4, the strap-retaining device 6 may instead be disposed inside the retainer 4. When the strap-retaining device 6 is disposed outside the retainer 4, it is not necessary to make the structure of the retainer 4 complex, and the strap-retaining device 6 is not exposed to high-temperature gas discharged from the inflator 3. The strap-retaining device 6 is not limited to that having the above-described structure, and may be replaced by various strap-retaining devices that have been commonly used.

The strap-restraining tether 7 limits the movement of the free end of the strap 5 that have been released. Specifically, the strap-restraining tether 7 includes the one end 71 that is connected to the strap 5, and the other end 72 that is connected to the airbag 2 or the retainer 4. The one end 71 of the strap-restraining tether 7 is connected to, for example, the outer surface (surface facing the outer shell of the airbag 2) of the strap 5 in the airbag 2, as illustrated in FIG. 1(A). The one end 71 of the strap-restraining tether 7 is connected to the strap 5 in a region A1 illustrated in FIG. 2(A) which is near a distal end portion at the other end 52 of the strap 5. Here, the region "near the distal end portion" means the region A1 between a central portion of the strap 5 to the other end 52 of the strap 5. The length of the strap-restraining tether 7 is set so that the projecting portion 21 can at least stand on the airbag 2 when the strap 5 is released from the strap-retaining device 6.

The strap-restraining tether 7 restrains the strap 5 that moves freely outside the airbag 2, and is therefore preferably configured to reduce the length of the strap 5 allowed to move freely to half or less. In the case where the strap-retaining device 6 is disposed outside the retainer 4, the one end 71 of the strap-restraining tether 7 may be connected to the strap 5 in a region A2 between the central portion of the strap 5 and the retainer position in accordance with the structure of the strap-retaining device 6. The connecting position of the one end 71 of the strap-restraining tether 7 is not limited to the above-described position, and may be set arbitrarily in accordance with, for example, the length of the strap 5 or the result of analysis of the behavior of the strap 5 that has been released.

As illustrated in FIG. 1(A), the other end 72 of the strap-restraining tether 7 is connected to the airbag 2 by sewing or the like at a position near the slit 23. When the other end 72 of the strap-restraining tether 7 is thus-connected to the airbag 2, even when the strap 5 is pulled by the projecting portion 21 and is ejected to the outside of the airbag 2, as illustrated in FIG. 1(B), the other end 52 of the strap 5 can be prevented from moving freely. The connecting position of the other end 72 of the strap-restraining tether 7 is not limited to the position near the slit 23, and may be set arbitrarily in accordance with conditions such as the length of the strap 5. For example, the connecting position may be near the inflator 3.

The other end 72 of the strap-restraining tether 7 may be connected to the retainer 4, as illustrated in FIG. 2(B). More specifically, the retainer 4 may include a bag ring 42 for securing the airbag 2 and the inflator 3, and the other end 72 of the strap-restraining tether 7 may be secured by the bag ring 42 together with the airbag 2. The bag ring 42 is fixed to the retainer 4 with a fixing member, such as a bolt. With this structure, the process of sewing the other end 72 of the strap-restraining tether 7 can be omitted, and the manufacturing process can be simplified.

A method for connecting the strap 5 and the strap-restraining tether 7 to each other will now be described. In the case where the strap 5 and the strap-restraining tether 7 are formed as separate components, as illustrated in FIG. 3(A), the strap-restraining tether 7 is placed on the strap 5 so that the one end 71 of the strap-restraining tether 7 is disposed at a predetermined connecting position on the strap 5. Then, a connecting portion 73 is formed by, for example, sewing, adhesion, or fusion bonding. When the connecting portion 73 is formed by sewing using a sewing thread, as illustrated the connecting portion 73 may be formed of a seam 73a that extends in the longitudinal direction of the strap 5. With this structure, the resistance generated when the connecting portion 73 passes through the slit 23 formed in the airbag 2 can be reduced, so that operations (for example, operation of opening the vent hole 22) carried out in response to releasing of the strap 5 are not impeded.

Alternatively, as illustrated in FIG. 3(B), the strap 5 may be provided with a widened portion 53 at which the width is increased and a cut portion 54 formed between the strap 5 and the widened portion 53. The widened portion 53 is folded onto the strap 5, and a connecting portion 73 may be formed by, for example, sewing, adhesion, or fusion bonding. When the strap-restraining tether 7 is formed of a portion of a member that forms the strap 5 as in this case, it is not necessary to take into account the positioning of the connecting position of the strap-restraining tether 7, and the manufacturing process can be simplified.

The above-described strap-restraining tether 7 may be made of the same material as the material of the strap 5, and may be formed of various types of woven or nonwoven fabric. The strap-restraining tether 7 may be made of a base cloth used to form the airbag 2 or a webbing material used to form a seat belt. When the strap 5 and the strap-restraining tether 7 are made of the base cloth or the webbing material, components that satisfy predetermined regulatory requirements regarding the strength, flame resistance, environmental resistance, etc. (for example, a requirement that degradation or functional impairment does not occur in a temperature range of –40° C. to 80° C.) in the field of vehicle safety devices can be easily obtained.

In the state illustrated in FIG. 1(B) in which the strap is released, a space surrounded by the airbag 2, the projecting portion 21, the strap 5, and the strap-restraining tether 7 is formed. Therefore, there is a possibility that another object, such as a structural member of the vehicle, will be caught in this space. Accordingly, the strap-restraining tether 7 may be configured such that it can be cut when a predetermined tension is applied thereto, so that the object that has been caught can be released. FIG. 4 illustrates the state in which the strap-restraining tether is cut, wherein FIG. 4(A) shows the case in which the strap-restraining tether is cut at the connecting portion between itself and the strap, FIG. 4(B) shows the case in which the strap-restraining tether is cut at an intermediate portion thereof, and FIG. 4(C) shows the case in which the strap-restraining tether is cut at a connecting portion between itself and the airbag device.

Figure 4A:
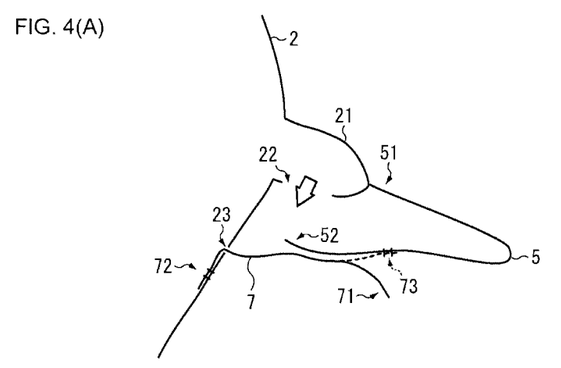
FIG. 4(A) shows the case in which the strap-restraining tether is cut at the connecting portion between itself and the strap.
Figure 4B:
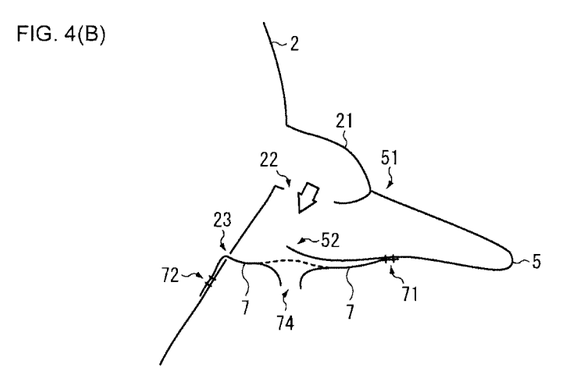
FIG. 4(B) shows the case in which the strap-restraining tether is cut at an intermediate portion thereof.
Figure 4C:
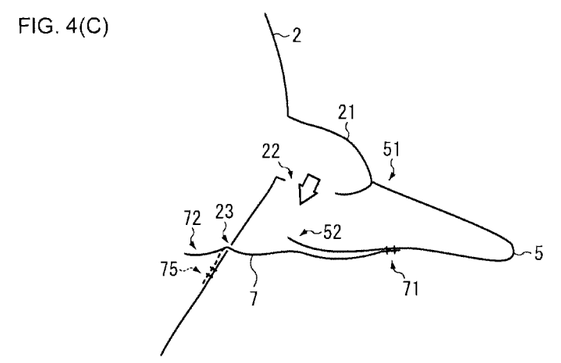
FIG. 4(C) shows the case in which the strap-restraining tether is cut at a connecting portion between itself and the airbag device.

As illustrated in FIGS. 4(A) to 4(C), the strap-restraining tether 7 may be cut at various positions. In the embodiment illustrated in FIG. 4(A), the strap-restraining tether 7 is cut at the connecting portion 73 between the strap-restraining tether 7 and the strap 5. In the embodiment illustrated in FIG. 4(B), the strap-restraining tether 7 is cut at an intermediate portion 74 thereof. In the embodiment illustrated in FIG. 4(C), the strap-restraining tether 7 is cut at a connecting portion 75 between the strap-restraining tether 7 and the airbag 2. In each figure, the strap-restraining tether 7 that is not yet cut is shown by the dotted line.

In the case where the strap-restraining tether 7 is cut at the connecting portion 73 or 75 of the strap-restraining tether 7 as illustrated in FIGS. 4(A) and 4(C), the bonding force provided by, for example, the sewing, adhesion, or fusion bonding process may be adjusted so that the strap-restraining tether 7 is cut when a predetermined tension is applied thereto. In the case where the strap-restraining tether 7 is cut at the intermediate portion 74 of the strap-restraining tether 7 as illustrated in FIG. 4(B), a cut (tear line), a partially narrowed portion, or a partially thinned portion may be formed at the intermediate portion 74 so that the strap-restraining tether 7 is cut when a predetermined tension is applied thereto.

Thus, the strap-restraining tether 7 may be formed such that it can be cut at the intermediate portion 74, the connecting portion 73, or the connecting portion 75 when a predetermined tension is applied thereto. In such a case, even when another object, such as a structural member of the vehicle, is caught in the space surrounded by the airbag 2, the projecting portion 21, the strap 5, and the strap-restraining tether 7, the object that has been caught can be easily released. The "predetermined tension" means a tension greater than a tension that is normally generated when the strap-restraining tether 7 is retained or released while no object is caught in the above-described space.

An example of an open/close control operation for the vent hole 22 formed in the projecting portion 21 in the above-described airbag device 1 will now be described. In the case where the occupant P is large (for example, a male adult), the occupant P is generally heavy, and a large inertial force is generated when the vehicle abruptly decelerates. Therefore, it is necessary that the airbag 2 can receive the occupant P while the inner pressure thereof is high. Accordingly, as illustrated in FIG. 1(A), the state in which the strap 5 is retained by the strap-retaining device 6 is maintained, so that the projecting portion 21 remains in the closed state. When the projecting portion 21 is in the closed state, the gas supplied to the airbag 2 from the inflator 3 is discharged only through the normally open vent hole, and the amount of gas discharged is small. Therefore, the inner pressure of the airbag 2 can be easily increased.

When the occupant P is small (for example, a female adult or a child), the occupant P is generally light, and a small inertial force is generated when the vehicle abruptly decelerates. Therefore, it is necessary that the airbag 2 can softly receive the occupant P by reducing the inner pressure thereof. Accordingly, as illustrated in FIG. 1(B), the strap 5 is released from the strap-retaining device 6 so that the projecting portion 21 is set to an open state. When the projecting portion 21 is in the open state, the gas supplied to the airbag 2 from the inflator 3 is discharged through both the normally open vent hole and the vent hole 22 formed in the projecting portion 21, and the amount of gas discharged can be increased. As a result, the inner pressure of the airbag 2 can be easily reduced.

In this case, the state in which the strap 5 is connected to the airbag device 1 with the strap-restraining tether 7 can be maintained, and the movement of the strap 5 outside the airbag 2 can be limited. Even when the other end 52 of the strap 5 is ejected to the outside of the airbag 2, the strap 5 can be restrained so that it does not move freely in the vehicle. Accordingly, deformation of the projecting portion 21 can be suppressed, and the strap 5 does not easily become entangled with, for example, a structural member of the vehicle.

Whether the occupant P is large or small can be easily determined by using a seat load sensor (not shown) connected to the electronic control unit (ECU). The seat load sensor is disposed in the seat S on which the occupant P sits. Instead of using the seat load sensor, the size of the occupant P may be determined by using a seat position sensor or processing an image obtained by a CCD camera or the like arranged in the vehicle.

When the occupant P sits on the seat S, whether the occupant P is large or small, or whether the occupant P is heavy or light, is determined by using the seat load sensor, and the result of the determination is stored in the ECU as occupant size information. The occupant size information is, for example, information based on which it is recognized that the occupant P is large when his or her weight is greater than a preset threshold and small when his or her weight is smaller than the threshold. When a collision or an abrupt deceleration of the vehicle is detected or predicted, the ECU controls the retained/released state of the strap 5 by controlling the strap-retaining device 6 on the basis of the occupant size information. More specifically, the strap-retaining device 6 is configured to retain the strap 5 when the occupant P is large or heavy, and release the strap 5 when the occupant P is small or light.

The above-described open/close control operation for the vent hole 22 is merely an example of a method of using the airbag device 1 including the strap 5 and the strap-retaining device 6, and may be changed as appropriate in accordance with the use and purpose of the airbag device 1.

Figure 5A:
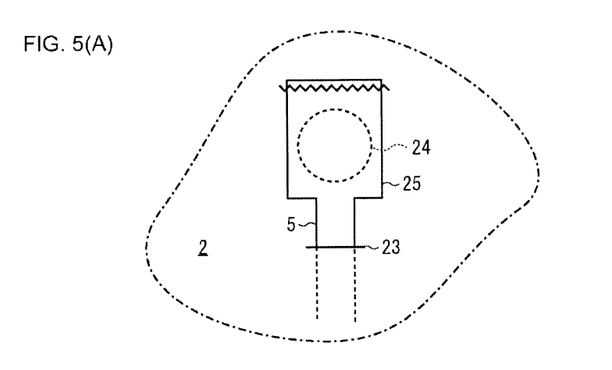
FIG. 5(A) shows a second embodiment.
Figure 5B:
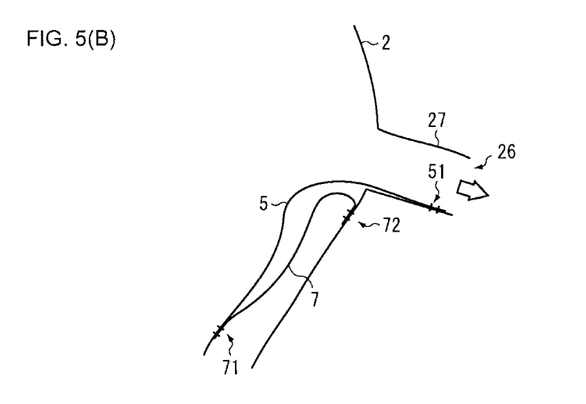
FIG. 5(B) shows a third embodiment.
Figure 5C:
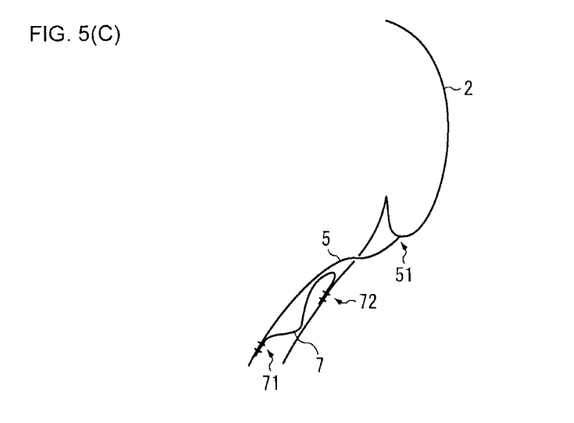
FIG. 5(C) shows a fourth embodiment.

Next, other embodiments of the above-described airbag device 1 will be described. FIG. 5 shows enlarged views of portions of airbag devices according to other embodiments of the present invention, wherein FIG. 5(A) shows a second embodiment, FIG. 5(B) shows a third embodiment, and FIG. 5(C) shows a fourth embodiment. Components similar to those of the airbag device 1 according to the above-described first embodiment are denoted by the same reference numerals, and redundant description will be omitted. Each figure is an enlarged view of only a portion that differ from the corresponding portion of the airbag device 1 according to the above-described first embodiment, and the structures of portions that are not illustrated are similar to those of the airbag device 1 according to the first embodiment.

Referring to FIG. 5(A), in an airbag device 1 according to the second embodiment, one end of a strap 5 is connected to a valve element 25 that opens or closes a vent hole 24 formed in an airbag 2. In other words, in the airbag device 1 according to the second embodiment, the valve element 25 is provided in place of the projecting portion 21 according to the first embodiment. Also in the second embodiment, the open/closed state of the vent hole 24 can be controlled by controlling the retained/released state of the strap 5 that is connected to the vent element 25.

Similar to the above-described first embodiment, the other end 52 of the strap 5 is connected to a strap-retaining device 6, and is easily ejected to the outside of the airbag 2 when released from the strap-retaining device 6. Accordingly, a strap-restraining tether 7 having a structure similar to that in the first embodiment is provided, so that, also in the second embodiment, the movement of the strap 5 outside the airbag 2 is limited. The strap-restraining tether 7 is omitted in FIG. 5(A).

Referring to FIG. 5(B), in an airbag device 1 according to the third embodiment, one end of a strap 5 is connected to a cylindrical member 27 that defines a vent hole 26 of an airbag 2. In other words, in the airbag device 1 according to the third embodiment, the cylindrical member 27 is provided in place of the projecting portion 21 according to the first embodiment. Also in the third embodiment, the open/closed state of the vent hole 26 can be controlled by controlling the retained/released state of the strap 5 that is connected to the cylindrical member 27.

Similar to the above-described first embodiment, the other end 52 of the strap 5 is connected to a strap-retaining device 6, and is easily ejected to the outside of the airbag 2 when released from the strap-retaining device 6. Accordingly, a strap-restraining tether 7 having a structure similar to that in the first embodiment is provided, so that, also in the third embodiment, the movement of the strap 5 outside the airbag 2 is limited.

Referring to FIG. 5(C), in an airbag device 1 according to the fourth embodiment, one end of a strap 5 is connected to an outer shell of an airbag 2. In the fourth embodiment, the shape into which the airbag 2 is deployed is controlled by the strap 5. More specifically, when the strap 5 is retained, the shape into which the airbag 2 is deployed is small. When the strap 5 is released, the shape into which airbag 2 is deployed is large. When the shape into which the airbag 2 is deployed is controlled in this manner, the airbag 2 can be deployed in accordance with the size or sitting position (including the case of so-called out-of-position) of the occupant P.

Similar to the above-described first embodiment, the other end 52 of the strap 5 is connected to a strap-retaining device 6, and is easily ejected to the outside of the airbag 2 when released from the strap-retaining device 6. Accordingly, a strap-restraining tether 7 having a structure similar to that in the first embodiment is provided, so that, also in the fourth embodiment, the movement of the strap 5 outside the airbag 2 is limited.

The present invention is not limited to the above-described embodiments, and the airbag device 1 may instead be, for example, a driver airbag device, a side airbag device, a curtain airbag device, a knee airbag device, or a pedestrian airbag device. Thus, various modifications are, of course, possible within the scope of the present invention.

What is claimed is:

1. An airbag device comprising:
    an airbag that is folded in a normal state and deployed in case of emergency,
    an inflator that supplies gas to the airbag,
    a retainer that secures the airbag and the inflator,
    a strap-retaining device that retains a strap, which is connected to a portion of the airbag at one end thereof, at the other end of the strap in a releasable manner, and a strap-restraining tether, which is connected to the strap at one end thereof and to the airbag or the retainer at the other end thereof,
wherein the strap-restraining tether is configured to limit the movement of the strap released from the strap-retaining device and ejected to the outside of the airbag.

2. The airbag device according to claim 1, wherein the one end of the strap is connected to an outer shell of the airbag, a valve element that opens and closes a vent hole formed in the airbag, a cylindrical member that defines the vent hole of the airbag, or a projecting portion having the vent hole of the airbag.

3. The airbag device according to claim 2, wherein the other end of the strap extends into the airbag through a slit formed in the airbag.

4. The airbag device according to claim 3, wherein a connecting portion between the strap-restraining tether and the strap is formed of a seam that extends in a longitudinal direction of the strap.

5. The airbag device according to claim 1, wherein the strap-restraining tether is connected to a region between a central portion of the strap and the other end of the strap.

6. The airbag device according to claim 1, wherein the strap-restraining tether is capable of being cut at an intermediate portion or a connecting portion when a predetermined tension is applied thereto.

7. The airbag device according to claim 1, wherein the strap-restraining tether is formed of a portion of a member that forms the strap.

8. The airbag device according to claim 1, wherein the strap and the strap-restraining tether are formed of a base cloth used to form the airbag or a webbing material used to form a seatbelt.

* * * * *